Patented May 28, 1929.

1,715,084

UNITED STATES PATENT OFFICE.

HARRY E. KAISER AND ROY S. HANCOCK, OF KENVIL, NEW JERSEY, ASSIGNORS TO HERCULES POWDER COMPANY, OF WILMINGTON, DELAWARE, A CORPORATION OF DELAWARE.

PROCESS OF RECOVERING HIGH-GRADE WOOD ROSIN.

No Drawing. Application filed August 18, 1926, Serial No. 130,103. Renewed August 8, 1928.

Our invention comprises a process of so treating rosin containing coloring matter and more especially wood rosin as to remove therefrom practically all of the objectionable coloring matter and produce a high grade rosin adapted for use in sizing the higher grades of paper and in manufacture of the better grades of varnish, and which is so thoroughly purified and refined that it is adapted for use in the manufacture of high grade rosin soaps and limed varnishes of satisfactory color, as well as for most, if not all, other purposes for which gum rosin is adapted.

A known process of producing wood rosin of a lower grade, and the process that we preferably, but not necessarily, employ as a preliminary process in the manufacture of our more highly refined rosin, consists in grinding wood and stumps from pine trees, placing the wood stock in large digesters, passing steam through the stock and thus driving off a considerable quantity of turpentine, flooding the stock with gasoline or other solvents thereby extracting certain materials, chiefly rosin, pine oil and various color bodies, passing the gasoline solution, commonly known as "drop liquor", through suitable evaporators, and fractionally removing the gasoline and pine oil. The pine oil produced by the distillation is refined and sold. The recovered gasoline is again used in the process.

The recovered rosin is a marketable product, but is not satisfactory for sizing the highest grades of paper or in making the higher grades of varnish, and therefore must be marketed at a relatively low price.

By means of a preliminary distillation, some of the objectionable coloring matter may be removed. By distilling under a high vacuum at a temperature of from 475°–650° F., preferably 550°–600° F., and fractionally condensing at temperatures of about 400° F., 350° F. and 300° F., three grades of rosin are recoverable, the highest grade being adapted for use in the manufacture of varnish and the higher grades of paper. The proportion of high grade rosin that is recoverable by this process, however, is substantially less than is recoverable by our process, and such rosin is not of a sufficiently high grade to be adapted for use in the manufacture of high grade rosin soaps and limed varnishes of satisfactory color; nor does such rosin have certain characteristics peculiar to the high grade rosin produced by our process, which characteristics will be hereinafter fully set forth.

In the practice of our process, the rosin may be first subjected to any desired distillation process, but such preliminary distillation is unnecessary, and it is preferred to omit it.

Our process comprises the formation of a solution of gasoline or other light petroleum distillate, rosin and furfuryl alcohol, its cooling or refrigeration with resultant separation of furfuryl alcohol and coloring bodies, and the recovery of high grade rosin from the remaining solution. The process may be carried out in a single operation, or in two or more operations. It is convenient and economical to divide the process into two operations, and it will be so described as a preferred way of practicing the process. Our process also contemplates, as a minor step, the conversion of the larger part of such minor part of the rosin as is not converted into high grade rosin, and which is of low grade, into medium grade rosin, but such medium grade rosin does not have the peculiar characteristics of the high grade rosin hereinafter claimed. Our process also contemplates the recovery and re-use of the furfuryl alcohol as well as the gasoline.

15 pounds of rosin are added to (say) 85 pounds of gasoline. With this composition is thoroughly mixed (say) 11 pounds of furfuryl alcohol. We start, therefore, with the following composition (A):

| | Pounds. |
|---|---|
| Gasoline | 85 |
| Rosin | 15 |
| Furfuryl alcohol | 11 |

The mixture should be heated, preferably to about 115° F. At this temperature a homogeneous solution is formed. The solution is then cooled to a moderate atmospheric temperature (say 60° F.), at which temperature more or less of the furfuryl alcohol is thrown out of solution. A rough or preliminary gravity separation can now be made and which results in a separation into layers. The undissolved furfuryl alcohol settles to the bottom, carrying with it most of the color bodies. About twenty per cent of the rosin and a little gasoline is also carried down with the furfuryl alcohol. The upper layer is a homogeneous solution of gasoline, rosin and furfuryl alcohol. Typical compositions of the two layers would be as follows (ignoring the small proportion of gasoline that is carried down by the furfuryl alcohol, and bearing in mind that the amounts of rosin and furfuryl alcohol in each layer are only approximate):

*Upper layer (B).*

| | Pounds. |
|---|---|
| Gasoline | 85 |
| Rosin | 12 |
| Furfuryl alcohol | 4.25 |

*Lower layer (C).*

| | Pounds. |
|---|---|
| Dark rosin | 3 |
| Furfuryl alcohol | 6.75 |

To the solution (B) resulting from the first treatment is now added more furfuryl alcohol, say 11 pounds, giving the following composition (D):

| | Pounds. |
|---|---|
| Gasoline | 85 |
| Rosin | 12 |
| Furfuryl alcohol | 15.25 |

To this mixture which comprises rosin and gasoline in solution in the undissolved furfuryl alcohol heat need not be applied, but it should be agitated to obtain a thorough washing of the solution by the undissolved furfuryl alcohol, and is then cooled down to about 10° F. in order to throw dissolved furfuryl alcohol out of solution and enable as complete a separation as possible; the solubility of furfuryl alcohol in gasoline decreasing with decrease of temperature. The mixture is then allowed to settle into layers. The undissolved furfuryl alcohol, which is by far the largest proportion of the furfuryl alcohol, settles to the bottom, with some of the rosin and the remaining coloring bodies. The upper layer is a homogeneous solution of gasoline and rosin, with a little furfuryl alcohol. Typical (approximate) compositions of the two layers are:

*Upper layer (E).*

| | Pounds. |
|---|---|
| Gasoline | 85 |
| Purified rosin | 10.5 |
| Furfuryl alcohcol | 2.125 |

*Lower layer (F).*

| | Pounds. |
|---|---|
| Dark rosin | 1.5 |
| Furfuryl alcohol | 13.125 |

From composition (E) the gasoline and then the furfuryl alcohol are distilled off, leaving a purified, highest grade rosin having the characteristics, hereinafter described, that distinguish the same from all other heretofore known wood rosins. The recovered gasoline and furfuryl alcohol are then re-used in the process.

Compositions (C) and (F), being the precipitates of the two described treatments, are then (preferably) mixed, giving the following (approximate) composition (G):

| | Pounds. |
|---|---|
| Dark rosin | 4.5 |
| Furfuryl alcohol | 19.875 |

The furfuryl alcohol is distilled off, leaving a dark or low grade rosin. The furfuryl alcohol is re-used in the process.

The low grade rosin may be dissolved in (say) 28 pounds of gasoline and the gasoline-soluble rosin extracted. The insoluble residue is a very dark, brittle substance, being about 5% of the original rosin (say .75 pounds). From the gasoline-rosin solution, the gasoline is distilled off, leaving about 3.75 pounds of a medium grade rosin, being about 25% of the original rosin. The recovered gasoline is re-used in the process.

While the above figures show a recovery of 70% of the original rosin as high grade rosin, the percentage of recovery by the practice of the process ranges from 70% to 75%.

While we have illustrated one way of carrying out the process involving two treatments, in the first of which the mixture of gasoline, rosin and furfuryl alcohol is heated to a relatively high temperature and then cooled to a medium temperature, followed by a gravity separation, and in the second of which the lighter product of the separation is refrigerated, followed by a gravity separation, it should be understood that the process is capable of being carried out, although with less economy of heat, by a single refrigerating treatment, preferably preceded by heating to insure a good homogenous solution, and followed by a gravity separation. It is also feasible, and may be in some cases advantageous, to increase the number of stages in the treatment. That is, there may be a succession of more or less rough separations of the character described, followed by a final separation.

Less advantageously and less economically, it is possible to dissolve rosin in gasoline and then wash the solution with furfuryl alcohol, no attempt being made to secure a homogeneous solution. Our process, therefore, in its broadest aspect, comprises the removal of color bodies from rosin by dissolving the rosin in gasoline or an equivalent solvent as any light petroleum distillate and removing color bodies therefrom by means of furfuryl alcohol.

It should also be understood that it is not intended to limit the separation step or steps to gravity separation. Other modes of separation, such as centrifugal force, may be substituted.

While we have specified gasoline as the solvent for the rosin and furfuryl alcohol, it is intended, by specifying that substance, to include operative equivalents, such as other petroleum distillates that have not too high a vaporizing temperature and which will be substantially immiscible with furfuryl alcohol. We have even used the lighter lubricating distillates of mineral oil. A heavy hydrocarbon product, however, is undesirable, or even impracticable, because of its decomposing action on the rosin in the step of distilling off the hydrocarbon.

The advantage of furfuryl alcohol is that it is capable of entering into solution with the gasoline at certain temperatures and of dissolving or absorbing the coloring bodies of the rosin, and yet can be largely thrown out of solution with the gasoline without giving up such coloring bodies.

The temperatures specified are largely a matter of choice, although it is desirable that the rosin-containing mixture shall be heated at the beginning to a temperature sufficiently high to form a substantially homogeneous solution, say in excess of 100° F. and that the refrigerating temperature at the end shall be below 25° F. Temperatures as high as 115° F. and as low as 10° F., as specified, are believed to be necessary to secure the best possible solution to start with and a maximum recovery of the highest grade rosin, although less nearly perfect results, with respect to quality and quantity, may be secured by departure from the above temperatures and it will be understood as indicated, that good results may be obtained by merely washing a solution of rosin with furfuryl alcohol, followed by separation of the furfuryl alcohol and color bodies of the rosin dissolved therein from the rosin solution, no attempt being made to form a homogeneous solution as by the application of heat and the separation being effected with or without cooling.

The relative proportions of the constituents specified in the several successive compositions are illustrative merely, and are susceptible of considerable variation.

Having now fully described our invention, what we claim and desire to protect by Letters Patent is:—

1. In the method of refining rosin, the step which includes subjecting rosin to treatment with furfuryl alcohol for the removal of color bodies from the rosin.

2. In the method of refining rosin the step which includes subjecting rosin in solution to treatment with furfuryl alcohol for the removal of color bodies from the rosin.

3. The method of refining rosin, which includes dissolving rosin in a solvent normally substantially immiscible with furfuryl alcohol, treating the rosin solution with furfuryl alcohol for the extraction of color bodies from the rosin, separating furfuryl alcohol and color bodies from the rosin solution and recovering refined rosin from the rosin solution.

4. The method of refining rosin, which includes dissolving rosin in a solvent normally substantially immiscible with furfuryl alcohol, treating the rosin solution with furfuryl alcohol for the extraction of color bodies from the rosin, reducing the temperature of the rosin solution, separating furfuryl alcohol and color bodies from the rosin solution and recovering refined rosin from the rosin solution.

5. The method of refining rosin, which includes dissolving rosin in gasoline, treating the gasoline-rosin solution with furfuryl alcohol for the extraction of color bodies from the rosin, separating furfuryl alcohol and color bodies from the gasoline-rosin solution and recovering refined rosin from the gasoline-rosin solution.

6. The method of refining rosin, which includes dissolving rosin in gasoline, treating the gasoline-rosin solution with furfuryl alcohol for the extraction of color bodies from the rosin, reducing the temperature of the gasoline-rosin solution, separating furfuryl alcohol and color bodies from the gasoline-rosin solution and recovering refined rosin from the gasoline-rosin solution.

7. The method of refining rosin, which includes dissolving rosin in a solvent normally substantially immiscible with furfuryl alcohol, adding furfuryl alcohol to the rosin solution for the extraction of color bodies from the rosin, heating the rosin solution to a temperature at which furfuryl alcohol will go into solution therein, cooling the solution formed to a temperature at which furfuryl alcohol and extracted color bodies will be thrown out of solution from the rosin solution, separating furfuryl alcohol and color bodies from the rosin solution and recovering refined rosin from the rosin solution.

8. The method of refining rosin, which includes dissolving rosin in gasoline, adding furfuryl alcohol to the gasoline-rosin solution for the extraction of color bodies from the rosin, heating the gasoline-rosin solution to a temperature at which furfuryl alcohol will go into solution in the gasoline-rosin solution, cooling the solution formed to a temperature at which furfuryl alcohol and extracted color bodies will be thrown out of solution from the gasoline-rosin solution, separating furfuryl alcohol and color bodies from the gasoline-rosin solution and recovering refined rosin from the gasoline-rosin solution.

9. The method of refining rosin, which includes dissolving rosin in gasoline, adding furfuryl alcohol to the gasoline-rosin solution for the extraction of color bodies from the rosin, heating the gasoline-rosin solution to a temperature at which furfuryl alcohol will go into solution in the gasoline-rosin solution, cooling the solution formed to a temperature of about 32° F., separating furfuryl alcohol and color bodies from the gasoline-rosin solution and recovering refined rosin from the gasoline-rosin solution.

In testimony of which invention, I, HARRY E. KAISER, have hereunto set my hand at Cologne, Germany, on this 2nd day of August, 1926, and I, ROY S. HANCOCK, have hereunto set my hand at Kenvil, New Jersey, on this 17th day of July, 1926.

HARRY E. KAISER.
ROY S. HANCOCK.